(12) United States Patent
Atsmon et al.

(10) Patent No.: US 10,193,957 B2
(45) Date of Patent: Jan. 29, 2019

(54) MULTIMEDIA FILE UPLOAD (71) Applicants: Dan Atsmon, Rehovot (IL); Alon Atsmon, Ganey-Tikva (IL)

(72) Inventors: Dan Atsmon, Rehovot (IL); Alon Atsmon, Ganey-Tikva (IL)

( * ) Notice: Subject to any disclaimer, the term of this patent is extended or adjusted under 35 U.S.C. 154(b) by 0 days.

(21) Appl. No.: 15/640,551

(22) Filed: Jul. 2, 2017

(65) Prior Publication Data

US 2017/0302726 A1    Oct. 19, 2017

Related U.S. Application Data

(63) Continuation of application No. 12/328,984, filed on Dec. 5, 2008, now Pat. No. 9,699,242.

(60) Provisional application No. 61/012,065, filed on Dec. 7, 2007.

(51) Int. Cl.
| | |
|---|---|
| *G06F 15/16* | (2006.01) |
| *H04L 29/08* | (2006.01) |
| *G06F 17/30* | (2006.01) |
| *H04L 29/06* | (2006.01) |

(52) U.S. Cl.
CPC .......... *H04L 67/06* (2013.01); *G06F 17/3028* (2013.01); *G06F 17/30244* (2013.01); *G06F 17/30247* (2013.01); *G06F 17/30256* (2013.01); *G06F 17/30899* (2013.01); *H04L 29/06* (2013.01); *H04L 29/06027* (2013.01); *H04L 67/02* (2013.01)

(58) Field of Classification Search
CPC ........... G06F 17/30247; G06F 17/3028; G06F 17/30256; G06F 17/30244; G06F 17/30899; H04L 67/02; H04L 67/06; H04L 29/06; H04L 29/06027

USPC ......... 709/203, 219, 231; 707/705, 706, 707
See application file for complete search history.

(56) References Cited

U.S. PATENT DOCUMENTS

| | | |
|---|---|---|
| 6,058,399 A | 5/2000 | Morag et al. |
| 7,286,256 B2 | 10/2007 | Herbert |
| 7,408,668 B2 | 8/2008 | Haneda et al. |

(Continued)

FOREIGN PATENT DOCUMENTS

| | | |
|---|---|---|
| WO | WO 2007/119602 | 10/2007 |
| WO | WO 2009/002313 | 12/2008 |

OTHER PUBLICATIONS

Advisory Action Before the Filing of an Appeal Brief dated Aug. 18, 2015 From the US Patent and Trademark Office Re. U.S. Appl. No. 12/328,984.

(Continued)

*Primary Examiner* — Oleg Survillo (57) ABSTRACT

A method of handling multimedia data in which packets of a multimedia file from a first computer are received by a second computer. In case, a sub-portion of the multimedia file, representative of the multimedia file, was received by the second computer, before the entire file was received by the second computer, that sub portion is handled by the second computer transmitting to the first computer, although the entire file was not received by the second computer at the time of the transmission of the result. Additionally, an image processing server is described comprising: a network interface adapted to receive packets, a communication manager adapted to manage reception of multimedia files through the input interface and to conclude when a sub-portion of a multimedia file, representative of the multimedia file received, and an image handling unit configured to handle said sub-portions.

20 Claims, 2 Drawing Sheets

(56) References Cited

U.S. PATENT DOCUMENTS

| | | |
|---|---|---|
| 8,108,535 B1 | 1/2012 | Roberts et al. |
| 8,261,307 B1 | 9/2012 | Islam et al. |
| 8,688,801 B2 | 4/2014 | Issa |
| 2002/0105658 A1 | 8/2002 | Jackson et al. |
| 2002/0130875 A1 | 9/2002 | Blackham et al. |
| 2002/0141661 A1 | 10/2002 | Steinberg |
| 2002/0184209 A1 | 12/2002 | Sato et al. |
| 2003/0086691 A1 | 5/2003 | Yu |
| 2003/0147563 A1 | 8/2003 | Liu et al. |
| 2004/0032968 A1 | 2/2004 | Andrew et al. |
| 2004/0049536 A1 | 3/2004 | Wand et al. |
| 2004/0128317 A1 | 7/2004 | Sull et al. |
| 2004/0240005 A1 | 12/2004 | Kim |
| 2005/0062991 A1 | 3/2005 | Fujishige et al. |
| 2005/0076062 A1 | 4/2005 | Sawano |
| 2005/0163378 A1 | 7/2005 | Chen |
| 2005/0210413 A1 | 9/2005 | Quek et al. |
| 2005/0219642 A1 | 10/2005 | Yachida et al. |
| 2006/0112413 A1 | 5/2006 | Ando et al. |
| 2006/0129631 A1 | 6/2006 | Na et al. |
| 2006/0171679 A1 | 8/2006 | Suh |
| 2007/0035764 A1 | 2/2007 | Aldrich et al. |
| 2007/0133947 A1 | 6/2007 | Armitage et al. |
| 2007/0143277 A1 | 6/2007 | Van De Laar et al. |
| 2007/0206622 A1 | 9/2007 | Houdaille et al. |
| 2007/0244925 A1 | 10/2007 | Albouze |
| 2007/0294333 A1 | 12/2007 | Yang et al. |
| 2008/0025649 A1 | 1/2008 | Liu et al. |
| 2008/0144069 A1 | 6/2008 | Austin |
| 2008/0209010 A1 | 8/2008 | Zitnick, III et al. |
| 2009/0041418 A1 | 2/2009 | Candelore et al. |
| 2009/0128560 A1 | 5/2009 | Schechter |
| 2009/0150517 A1 | 6/2009 | Atsmon et al. |
| 2010/0223568 A1 | 9/2010 | Quek et al. |
| 2013/0080692 A1 | 3/2013 | Feinberg et al. |

OTHER PUBLICATIONS

Advisory Action Before the Filing of an Appeal Brief dated Jul. 23, 2015 From the US Patent and Trademark Office Re. U.S. Appl. No. 12/328,984.
Notice of Allowance dated Mar. 2, 2017 From the US Patent and Trademark Office Re. U.S. Appl. No. 12/328,984. (11 pages).
Official Action dated Mar. 1, 2011 From the US Patent and Trademark Office Re. U.S. Appl. No. 12/328,984.
Official Action dated Sep. 6, 2011 From the US Patent and Trademark Office Re. U.S. Appl. No. 12/328,984.
Official Action dated Apr. 7, 2015 From the US Patent and Trademark Office Re. U.S. Appl. No. 12/328,984.
Official Action dated Aug. 12, 2016 From the US Patent and Trademark Office Re. U.S. Appl. No. 12/328,984.
Official Action dated Aug. 13, 2014 From the US Patent and Trademark Office Re. U.S. Appl. No. 12/328,984.
Official Action dated Aug. 19, 2010 From the US Patent and Trademark Office Re. U.S. Appl. No. 12/328,984.
Official Action dated Feb. 23, 2012 From the US Patent and Trademark Office Re. U.S. Appl. No. 12/328,984.
Statement of Substance of Interview dated Oct. 9, 2011 Following Official Action dated Sep. 6, 2011 From the US Patent and Trademark Office Re. U.S. Appl. No. 12/328,984.
Applicant-Initiated Interview Summary dated Jun. 12, 2015 From the US Patent and Trademark Office Re. U.S. Appl. No. 12/328,984.

MULTIMEDIA FILE UPLOAD

RELATED APPLICATIONS

This application is a continuation of U.S. patent application Ser. No. 12/328,984 filed on Dec. 5, 2008, which claims the benefit of priority from U.S. Provisional Patent Application No. 61/012,065 filed on Dec. 7, 2007.

The contents of the above applications are all incorporated by reference as if fully set forth herein in their entirety.

FIELD OF THE INVENTION

The present invention relates to multimedia file processing.

BACKGROUND OF THE INVENTION

The bandwidth available for computer communications has increased in recent years. In many countries, people commonly connect to the Internet with a downlink bandwidth of at least 0.5 mbps (Megabits per second) and an uplink bandwidth of at least 64 kbps. Many applications, however, require large amounts of bandwidth, such as transfer of images and video streams. Uploading an image of 1-2 Mbytes typically takes 1-2 minutes and therefore users often are frustrated by the slow response when uploading images or other multimedia files.

Several methods for shortening the response time m transfer of images were developed over a decade ago, when download speeds were also relatively low.

U.S. Pat. No. 7,200,858 to Benjamin et al., titled "Data distribution system", the disclosure of which is entirely incorporated herein by reference, describes a method for transmitting images for diagnostic purposes. The method includes downloading an applet to a user and using the applet to download images in a manner allowing gradual improvement of their quality. The applet also allows the user to stop the download in the middle when the quality of the image is sufficient in the user's eyes.

Other more recent solutions have been suggested specifically for uploading of images.

US patent publication 2005/0007625 to Garcia, titled: "Method and system for distributed image processing and storage", the disclosure of which is entirely incorporated herein by reference, describes software that aids photographers in processing and uploading images to a host site. One option provided by the software allows the uploading of thumbnail images to a website for selection by customers. In response to requests for selected images from customers, the high resolution copy of the image is provided to the customer.

US patent publication 2003/0063770 to Svendsen et al., titled "Network-Based Photosharing Architecture", the disclosure of which is entirely incorporated herein by reference, describes a photo sharing network based on uploading thumbnail images.

US patent publication 2007/0035764 to Aldrich et al., titled: "System and Method for Uploading Files", the disclosure of which is entirely incorporated herein by reference, describes an upload manager installed on a client computer. In response to an upload request, the upload manager generates a thumbnail which is uploaded immediately and then uploads the complete image at a later time when resources are available.

Uploading from many clients concurrently may also overload the server.

U.S. Pat. No. 7,181,623 to Golubchik et al., titled: "Scalable Wide-Area Upload System and Method", the disclosure of which is entirely incorporated herein by reference, describes a method of timing uploads to avoid overloading the server.

Further methods for download of images have also been suggested.

US patent publication 2006/0195507 to Baek et al., titled "Method and System for Providing Users a Lower Fidelity Alternative Until a Higher Fidelity Experience is Available", the disclosure of which is entirely incorporated herein by reference, describes downloading a low fidelity image before downloading a high fidelity image in order to reduce the waiting time of a human viewing the downloaded file.

One drawback of these solutions is the requirement for utilizing additional software on the client computer. Most users, however, do not agree to install additional software on their computer due to safety and stability considerations.

SUMMARY OF THE INVENTION

An aspect of some embodiments of the present invention relates to a method of uploading a multimedia unit from a client to a server or other computer. The method includes having a user indicate a multimedia file to be uploaded and initiate the upload according to standard web file transfer methods. During the file upload, the file is examined to determine whether it includes a thumbnail or other abbreviated version or representative portion of the multimedia unit, and if such an abbreviated version is identified the abbreviated version is extracted and provided for server processing before the upload is completed. Optionally, the upload is stopped in the middle after the abbreviated version was entirely uploaded. Thus, the basic information of the image is uploaded very fast, allowing the server to respond to the user with a fast response. In some embodiments of the invention, the method is carried out without requiring installation or otherwise running of any dedicated software for managing the upload of multimedia files on the client computer. It is noted that in some embodiments of the invention the upload of the image is performed on the client computer by standard software which does not differentiate between different types of files and particularly does not differentiate between media and non-media files.

Optionally, the user is not notified that the upload was stopped in the middle, but rather is given the impression that the upload was completed.

In some embodiments of the invention, the multimedia file comprises an image acquired by a camera which also generates the thumbnail from the image. In other embodiments, the multimedia file comprises a video stream and the representative portion comprises a single frame of the video stream, a limited number of frames of the stream or an audio portion of the video stream.

An aspect of some embodiments of the present invention relates to a method of comparing images in which a first image on a first computer is compared to a second image on a second computer. A reduced size version of the first image is transferred to the second computer and the comparison is performed by the second computer based on the reduced size version of the first image. While using a complete version of the first image would provide a more accurate comparison, in some applications it has been determined, in accordance with some embodiments of the present invention, that a sufficiently accurate result can be achieved with a reduced size image, which may enjoy much faster upload. In some embodiments of the invention, the image comparison method used is a fast method which allows for a higher level of false positives in order to achieve higher speeds. Given such a method, the degradation in quality due to use of a thumbnail rather than a full image in the comparison is expected to be negligible in most cases. Using a combination of a fast upload and a fast search, a search process can provide results within a very short response time.

Optionally, the first computer is a client computer and the second computer is a server computer.

In some embodiments of the invention, the provided search results include a relatively large number of images, optionally more than 50, more than 100 or even more than 500 images. Optionally, in displaying the results, more than 30, more than 80 or even more than 90 images are displayed together, allowing the user to determine which images are desired.

There is therefore provided in accordance with an exemplary embodiment of the invention, a method of handling multimedia data, comprising receiving packets of a multimedia file from a first computer, by a second computer; concluding that a sub-portion of the multimedia file, representative of the multimedia file, was received by the second computer, before the entire file was received by the second computer; handling the sub-portion by the second computer responsive to concluding that the sub-portion was received; and transmitting to the first computer or to a third computer a result of the handling of the sub-portion, although the entire file was not received by the second computer at the time of the transmission of the result.

Optionally, the multimedia file comprises an image file. Optionally, the sub-portion of the multimedia file comprises a low resolution version of the image. Optionally, the sub-portion of the multimedia file comprises a thumbnail image. Optionally the method includes transmitting to the first computer an instruction to display a request for a multimedia file, on a display of the first computer, and wherein receiving the packets from the first computer comprises receiving in response to transmitting the instruction. Optionally, concluding that the sub-portion was received by the second computer comprises receiving a notification from the first computer. Optionally, concluding that the sub-portion was received by the second computer comprises determining that a number of bytes expected to include the sub-portion, were received by the second computer.

Optionally, concluding that the sub-portion was received by the second computer comprises determining that the transmission was carried out over a period sufficient to include the entire sub-portion. Optionally, concluding that the sub-portion was received by the second computer is performed by the second computer examining the content of the received packets. Optionally the method includes proceeding operation of the first computer as if the transmission of the multimedia file was completed responsive to the transmitting of the result to the first computer, although the entire file was not received by the second computer. Optionally, handling the sub-portion comprises searching for images similar to the image of the file, in an image database. Optionally, handling the sub-portion comprises providing the sub-portion within a web page provided by the second computer to the first computer.

Optionally the method includes stopping the transmission of the multimedia file responsive to the concluding. Optionally, the transmitted result of the handling appears as if the handling was performed on the entire file. Optionally, transmitting the result comprises transmitting the result to the first computer. Optionally, receiving the packets from the first computer comprises receiving packets transmitted by the first computer by a program which does not differentiate between media and non-media files. Optionally, transmitting a result of the handling comprises transmitting a multimedia file not identical to the multimedia files from which a portion was received.

There is further provided in accordance with an exemplary embodiment of the invention, a method of handling multimedia data, comprising receiving packets of a multimedia file from a first computer, by a second computer; concluding that a sub-portion of the multimedia file, representative of the multimedia file, was received by the second computer, before the entire file was received by the second computer; stopping the receiving of packets of the multimedia file before receiving the entire file; and handling the sub-portion by the second computer responsive to concluding that the sub-portion was received.

Optionally, the multimedia file comprises an image file. Optionally, the sub-portion of the multimedia file comprises a low resolution version of the image. Optionally, the sub-portion of the multimedia file comprises a thumbnail image. Optionally, the method includes transmitting to the first computer an instruction to display a request for a multimedia file, on a display of the first computer, and wherein receiving the packets from the first computer comprises receiving in response to transmitting the instruction. Optionally, concluding that the sub-portion was received by the second computer comprises receiving a notification from the first computer. Optionally, concluding that the sub-portion was received by the second computer comprises determining that a number of bytes expected to include the sub-portion, were received by the second computer.

Optionally, concluding that the sub-portion was received by the second computer comprises determining that the transmission was carried out over a period sufficient to include the entire sub-portion. Optionally, concluding that the sub-portion was received by the second computer is performed by the second computer examining the content of the received packets.

Optionally, handling the sub-portion comprises searching for images similar to the image of the file, in an image database. Optionally, handling the sub-portion comprises providing the sub-portion within a web page provided by the second computer to the first computer. Optionally, stopping the receiving of the packets comprises stopping responsive to the concluding. Optionally, receiving the packets from the first computer comprises receiving packets transmitted by the first computer by a program which does not differentiate between media and non-media files.

There is further provided in accordance with an exemplary embodiment of the invention, a method of handling multimedia data, comprising receiving, at a first computer, from a user, a name of a multimedia file to be uploaded to a second computer; transmitting packets of the multimedia file by the first computer, to the second computer, responsive to the received file name; and receiving, at the first computer, from the second computer, a result of handling the multimedia file, based on a representative sub-portion of the file included in the transmitted packets, although the packets transmitted by the first computer did not include the entire multimedia file, at the time of receiving the result.

Optionally, receiving the name of the multimedia file comprises receiving without any separate indication of a sub-portion of the multimedia file, beyond what is included in the file itself. Optionally, transmitting the packets by the first computer comprises transmitting by a software which does not transmit multimedia and non-multimedia files differently. Optionally, the result of the handling comprises a plurality of similar, but not identical, multimedia files. Optionally, transmitting the packets of the multimedia file comprises transmitting packets for a predetermined amount of time, instructed by the second computer.

Optionally, transmitting the packets of the multimedia file comprises transmitting less than 10% of the file. Optionally, transmitting the packets of the multimedia file comprises transmitting more than the representative sub-portion. Optionally, transmitting the packets of the multimedia file comprises transmitting packets of an image file including a thumbnail, wherein transmitting the packets comprises transmitting packets including the entire thumbnail together with a portion of the actual image. Optionally, transmitting the packets of the multimedia file comprises transmitting by a software which does not review the content of files it transmits.

There is further provided in accordance with an exemplary embodiment of the invention, an image processing server, comprising a network interface adapted to receive packets; a communication manager adapted to manage reception of multimedia files through the input interface and to conclude when a sub-portion of a multimedia file, representative of the multimedia file, was received; and a image handling unit configured to handle sub-portions concluded to have been received by the communication manager and to transmit a result of the handling through the network interface, although the entire file including the sub-portion was not received through the network interface at the time of the transmission of the result.

Optionally, the network interface comprises an interface adapted to connect to the Internet. Alternatively or additionally, the network interface comprises an Ethernet or IP interface. Optionally, the multimedia file comprises an image and the sub-portion of the multimedia file comprises a low resolution version of the image. Optionally, the image handling unit comprises a search engine adapted to find images similar to a received image.

There is further provided in accordance with an exemplary embodiment of the invention, a method of searching an image database, comprising receiving a thumbnail image, by a search engine; and searching through an image database by the search engine, for images similar to the thumbnail image.

Optionally, receiving the thumbnail image comprises receiving an image represented by fewer than 30,000 pixels. Optionally, receiving the thumbnail image comprises receiving packets of a file including both large image data and the thumbnail. Optionally, searching through the image database comprises determining a plurality of parameters of the thumbnail image and comparing the parameters to respective parameters of the database images.

BRIEF DESCRIPTION OF THE DRAWING

The present invention will now be described in the following detailed description of exemplary embodiments of the invention and with reference to the attached drawings, in which dimensions of components and features shown are chosen for convenience and clarity of presentation and are not necessarily shown to scale. Generally, only structures, elements or parts that are germane to the discussion are shown in the figure.

DETAILED DESCRIPTION OF SOME EMBODIMENTS

Overview

Figure 1:
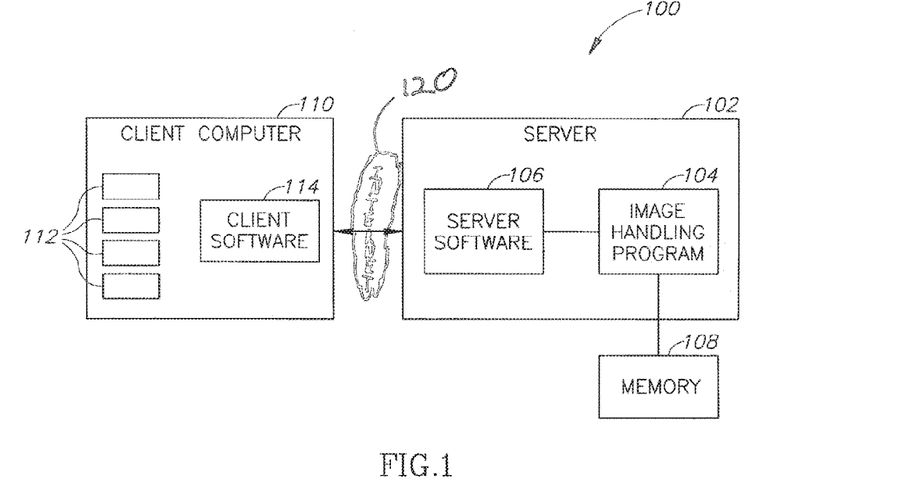
FIG. 1 is a schematic illustration of a communication setup, which may benefit from methods in accordance with an exemplary embodiment of the invention.

FIG. 1 is a schematic illustration of a communication setup 100, which may benefit from methods in accordance with an exemplary embodiment of the invention. In setup 100, a server 102 runs an image handling program 104, which provides image handling services to clients. Optionally, clients, such as client computer 110, provide image files 112 to image handling program 104 for handling. The transmission of images from client computer 110 to server 102 is optionally performed by a client software 114 running on client computer 110 and a server software 106 running on server 102. The transmission of the images may be performed over substantially any communication network, for example, the Internet 120. A memory 108 is optionally used by server 102 to store images.

Client software 114 is optionally a web browser, such as Internet Explorer™ or Mozilla™. In some embodiments of the invention, in uploading files to server software 106, client software 114 does not differentiate between different types of files and, particularly, applies the same handling to image and non-image files. Server software 106 and client software 114 optionally communicate in accordance with the HTTP protocol. Server software 106 is optionally a standard web server configured to perform the acts described with relation to FIG. 2. Optionally, the configuration is performed in the web pages supplied by the web server, while the code of server software 106 is not altered to perform the method of FIG. 2. Alternatively or additionally, image handling program 104 is adapted to perform some of the acts of the method of FIG. 2 and/or to control the operation of the acts by server software 106.

Client computer 110 may be of substantially any type known in the art, including a desktop computer or a laptop computer. Furthermore, the tasks of client computer 110 may be performed by any other processing device having web browsing and/or other processing capabilities, such as a personal digital assistant (PDA) or a mobile phone (e.g., a cellular phone), which for purposes of brevity are referred to herein as computers.

Image Handling

Image handling program 104 may perform any of a plurality of image handling tasks, such as comparing of two images to determine the extent of similarity therebetween, finding a first image within a second image and/or searching through a database of images, for example a database stored in memory 108, for similar images. In some embodiments of the invention, a search through a database for a similar image is performed in order to identify a subject included in a user-uploaded image in a database image having associated text identifying its content. For example, the search in the database may be used to identify a person, location, object, plant, animal, art work or other subject in an uploaded image. Alternatively or additionally, image handling program 104 is adapted to display images to a human for analysis, for example so the human can identify a subject or signs of disease. The image database may be very large and may include more than 100,000 images, more than a million images or even more than 10 million images.

The search for similar images in the database may be performed using substantially any suitable search method known in the art.

In an exemplary embodiment of the invention, a user may upload an acquired image of a plant and receive in return a name of the plant based on a search of the image in a database. Likewise, a user may upload an image of a location and receive a map of the location. A further example relates to uploading an image of an appliance to aid telephone service personnel in determining the specific device for which service is required.

Image handling program 104 may further display uploaded images on a web site, optionally when a fast display of uploaded images is required, for example in an auction or other interactive scenario.

File Upload

Figure 2:
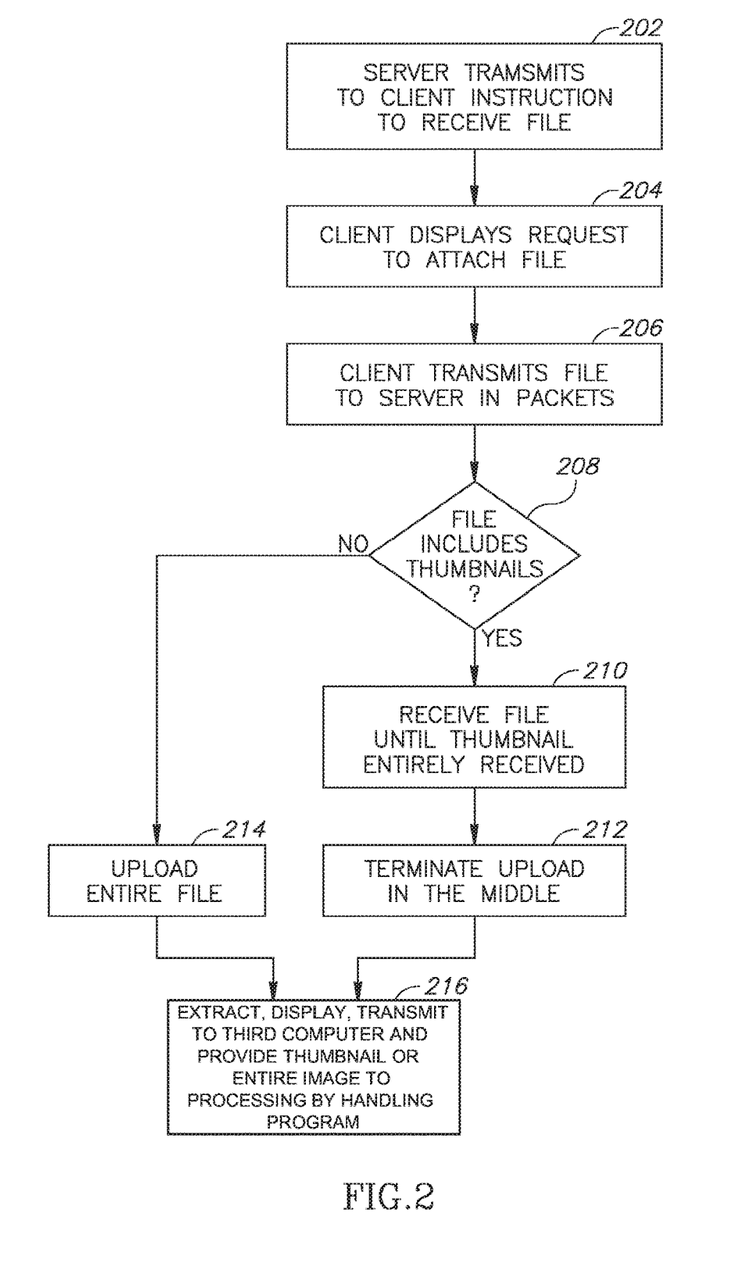
FIG. 2 is a flowchart of acts performed in uploading an image, in accordance with an exemplary embodiment of the invention.

FIG. 2 is a flowchart of acts performed in uploading an image, in accordance with an exemplary embodiment of the invention. Server software 106 transmits (202) an instruction to client software 114 to display to the user the possibility of uploading a file. The instruction is optionally transmitted (202) responsive to a request from client software 114 to receive a web page from server 102 and/or in response to the user actuating a control on the web page indicating a desire to upload a file.

Client software 114 displays (204) to the user a request to attach a file, optionally together with a notice of the purpose of the file, for example stating that the file is to be used in a search for similar images in an image database. Upon attaching the file, client software 114 begins transmitting (206) the file to server software 106. In some embodiments of the invention, the file is transmitted in packets, as is known on the art. Upon receiving the transmitted packets of the file, server software 106 examines the received packets of the file to determine whether the file includes a thumbnail of the image. If (208) the file includes a thumbnail, server software 106 continues (210) to receive the packets until the thumbnail is completely received and then server software 106 terminates (212) the upload of the file. If (208), however, the file does not include a thumbnail, server software 106 allows the file to be uploaded (214) in its entirety.

The uploaded thumbnail image, or the entire image if a thumbnail was not present, is extracted and provided (216) to image handling program 104 for processing. Optionally, in parallel, the image is displayed to the user. Optionally, in parallel, the image is transmitted to a third computer. Alternatively, the processing is performed within a short period, such that the results of the processing are displayed to the user within a reasonable response time from the point of view of the user. In some embodiments of the invention, the processing time from when the thumbnail was received until a result is provided to the client for display is on the average less than 10 seconds, or even less than 5 seconds or two seconds. The upload time is optionally shorter than the processing time until a result is provided. Alternatively, the upload time is longer than the processing time, but optionally not much longer, for example not more than two or three times longer.

The thumbnail image is optionally represented by fewer than 100,000 pixels or even fewer than 15,000 pixels. In some embodiments of the invention, the thumbnail images have width and height which are both shorter than 200 pixels.

Referring in detail to transmitting (202) the instruction to request the user to indicate a file name, in some embodiments of the invention, the instruction is provided together with a web page provided in response to a client provided URL of the web page. Thus, from the point of view of client software 114, it is merely carrying out instructions received with a web page. The displaying (204) of the attachment request to the user is optionally performed as a standard operation of client software 114.

In some embodiments of the invention, in transmitting (206) the file to server 102, client software 114 does not examine the contents of the file and does not differentiate between different types of files, beyond possibly their type as indicated by the extension of their name.

The file is optionally uploaded in a standard format, such as the EXIF header format of the JPEG standard. Server software 106 optionally reviews the uploaded file and identifies whether the header of the file includes a thumbnail in the intended field.

Optionally, the termination (212) is performed in a manner which gives the user of client computer 110 the impression that the file was received in its entirety. In some embodiments of the invention, in accordance with a protocol governing the upload (e.g., HTTP, WSP or HTTPS), upon receiving each portion of the file it is up to the server to send a request to the client for a further portion of the file. When server 102 is to terminate the upload, server software 106 simply does not request additional portions of the file. In some embodiments of the invention, server software 106 transmits an HTTP OK signal to the client when it decides to terminate the upload. In some embodiments of the invention, upon a decision to terminate the upload, server software 106 transmits a different web page to the client than the page used during the upload. The different page may include for example results of processing the uploaded image, a notification that the results will be provided soon or an advertisement or "please wait" notice.

Optionally, in server 102, the received packets are forwarded to image handling program 104 which extracts the image data from the packets, determines that the thumbnail was entirely received and then instructs server software 106 to terminate the upload. In some embodiments of the invention, due to the method in which the file is divided into packets, the uploaded portion of the file typically includes portions of the file not needed by image handling program 104, such as a portion of the actual full scale image. It is also noted that after the termination of the upload another image may be immediately uploaded by the user, but this is not necessary and it is expected that in many cases after the termination of the upload, the upload bandwidth from client computer 110 in the direction of server 102 will be at least partially idle for more than 10 seconds, more than 30 seconds or even more than a minute after the upload is terminated.

Alternatively to stopping the upload based on a determination that the entire thumbnail was received, a time by which the thumbnail will have been completely received may be estimated. For example, handling program 104 or server software 106 may stop the upload after a predetermined time and/or after receiving a predetermined amount of data, which is expected to include the entire thumbnail. In some embodiments of the invention, the upload termination is performed only after it was determined that the file actually includes a thumbnail. If, however, the termination was premature, server software 106 optionally instructs client software 114 to resend the file.

It is noted that in a single session the user may consecutively upload a plurality of images in accordance with the above methods.

Other Upload Methods

Alternatively to uploading the file in response to a request from server 102, the file may be provided at the initiative of the client or user, without being preceded by a server instruction. For example, the file may be transmitted in an MMS (Multimedia Messaging Service) message, an email or using any other communication protocol.

In some embodiments of the invention, when the file is transmitted as an attachment to an email message, the termination is performed by disconnecting the connection and results in an error message notifying the client that the email message was not properly received. Optionally, the user is notified in advance, or together with the processing results, that the error message should be ignored, as the required information was received. Alternatively, the email client on client computer 110 is changed to identify cases in which the transmission was terminated because the thumbnail was received, for example based on a short message from the server, and in such cases does not display an error message to the user.

Optionally, the termination of the email is performed at server 102, which hosts image handling program 104. In accordance with this option, the premature termination of the upload may not reduce the load on the client computer 110, but still reduces the load on server 102. In other embodiments of the invention, the termination of the email is performed at an email server receiving the email from client computer 110, and accordingly the load on client computer 110, and the transmission time therefrom, is reduced.

Client Controlled Operation

Alternatively to the stopping of the upload being performed by server software 106, the stopping of the upload is performed by client software 114. Optionally, in the instruction to upload the file, client software 114 is also provided a termination time of the upload and/or a limit on the length of the file that is to be uploaded. The instructions are optionally provided to client software 114 in a JavaScript or a flash module which does no breach the security rules of web browsers and optionally operates in a manner transparent to the user of client computer 110. In some embodiments of the invention, when the upload of the file begins, the JavaScript or flash module begins a count-down, at the end of which the upload is terminated by client software 114. Alternatively, client software 114 counts the transmitted data bytes and when a predetermined amount is reached, the upload is terminated. Optionally, at the beginning of the upload, client software 114 notifies server software 106 that it will be terminating the upload in the middle.

In some embodiments of the invention, the time and/or number of bytes is selected such that the thumbnail will always or nearly always have been uploaded when the upload is terminated. If, however, the termination was premature, or the file does not include a thumbnail at all, server software 106 may instruct client software 114 to resend the file.

Using a standard web browser, which does not examine the contents of files it handles and does not differentiate between different types of files, beyond their names and perhaps suffix, has the advantage that no additional installation on the client is required to implement acts in accordance with embodiments of the present invention. Nonetheless, in some embodiments of the invention, client software 114 is dedicated software configured to handle image files differently from non-image files. In some embodiments of the invention, in accordance with this alternative, client software 114 reviews the transmitted file and stops the upload after the transmission of the thumbnail was completed. Client software 114 may be a program installed on client computer 110 or may be an applet, e.g., Mozilla plugin, activeX or Java applet, or AddOn, such as a FireFox AddOn or a toolbar (e.g., browser toolbar). The applet or AddOn may be downloaded from server software 106 upon establishment of a connection or may be provided at any other suitable time.

Complete Upload

Instead of stopping the upload once the thumbnail is received, the upload may continue in parallel to passing the thumbnail to image handling program 104. The upload of the file optionally continues in the background, while the user interacts with server 102 as if the image was uploaded in its entirety. In some embodiments of the invention, if the user attempts to upload an additional image, the complete upload of images for which a thumbnail was already uploaded is postponed or even cancelled. Image handling program 104 optionally performs its processing on the thumbnail and provides results accordingly. For example, when image handling program 104 performs an image comparison, program 104 optionally performs its comparison based on the thumbnail and provides the comparison results to the user before the upload of the entire image is completed. When the entire image is finally received, the comparison may be repeated to fine tune the results. Alternatively or additionally, image handling program 104 displays the uploaded thumbnail to the user and/or to other users, for example by placing the thumbnail on a web page or emailing it, before the upload of the entire image is completed.

Thumbnail in Middle or at End

While the above description relates to files in which the thumbnail is in the beginning of the file, there may be cases in which the thumbnail is in the middle or at the end of the file. Optionally, in such cases, the server requests from the client to upload only a middle or ending portion of the file. For example, if upon receiving a first packet of the file the server determines that the file has a thumbnail at the end, the server determines from the first packet the length of the file and accordingly requests that the client transmit a portion at the end of the file estimated to include the thumbnail.

Other Multimedia

In the above description, time saving was achieved by continuing the server operation as if the entire image was uploaded, upon receiving the thumbnail. Similar procedures may be used for other uploaded files and/or other multimedia partial portions. For example, in uploading images, low resolution images other than thumbnails may be used, for image files of other formats. In an exemplary embodiment of the invention, images are provided in a layer format and the server extracts the lowest layer and proceeds as if the entire image was received.

In some embodiments of the invention, in uploading a video file the upload is stopped after a predetermined time or amount of data is received. For example, the upload may be stopped after a predetermined number of frames and/or a specific length of audio data is received. The server may then extract from the uploaded portion a representative frame and/or audio segment to be used by a video handling process, for example for searching for similar video files. The predetermined portion may be relatively short if the video stream includes a representative snapshot in its header and/or if the first frame may be used. In some embodiments of the invention, a longer portion may be uploaded, for example including more than 10 frames, 50 frames or even more than 100 frames, to allow for finding a good representative frame or several substantially different representative frames in the uploaded portion. Optionally, however, the portion may be kept short, for example including fewer than 200, fewer than 100 or even fewer than 50 frames, in order to limit the upload time.

Server 102 optionally examines the uploaded portion and extracts therefrom a representative frame. Various characteristics which qualify a frame as being representative may be used, for example a frame similar to a plurality of other frames in the video stream and/or a frame which has a large spatial diversity (e.g., not a mere view of a clear sky). Alternatively or additionally, a frame qualifies as being representative if it shows specific objects, such as a person. Alternatively or additionally to extracting a representative frame or several frames, representative audio signals may be extracted from the uploaded portion. The representative portion may be used, for example in searching for similar video files. In some embodiments of the invention, the search is performed solely by an audio segment, as it is expected that a similar video file will have the same audio portions and it is easier to perform a comparison only on the audio portions.

In some embodiments of the invention, rather than uploading a portion of a predetermined size, server 102 may examine the video frames as they are uploaded and determine to stop the upload, when the received content is sufficient. The size of the uploaded portion may also depend on the size of the entire video file. Large files may be represented by larger portions than smaller files.

While the upload may include only a single consecutive portion of the file, in some embodiments of the invention, the server instructs the client to upload a plurality of disjoint portions, in order to collect frames from different scenes of the video movie in the file. Optionally, each time the server instructs the client to skip to a letter segment of the file, the server continues the upload until an Intra frame (I-frame) is received. Once the I-frame is received, the server jumps to a later portion of the file.

CONCLUSION

It is noted that the present invention is not limited to a client-server setup, but rather may also be used in a peer to peer upload scenario.

It will be appreciated that the above described methods may be varied in many ways, including, changing the order of steps, and/or performing a plurality of steps concurrently. It will also be appreciated that the above described description of methods and apparatus are to be interpreted as including apparatus for carrying out the methods and methods of using the apparatus. The present invention has been described using non-limiting detailed descriptions of embodiments thereof that are provided by way of example and are not intended to limit the scope of the invention. Many specific implementation details may be used.

It should be understood that features and/or steps described with respect to one embodiment may sometimes be used with other embodiments and that not all embodiments of the invention have all of the features and/or steps shown in a particular figure or described with respect to one of the specific embodiments.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Variations of embodiments described will occur to persons of the art. Therefore, the scope of the invention is limited only by the elements and limitations as used in the claims, wherein the terms "comprise," "include," "have" and their conjugates, shall mean, when used in the claims, "including but not necessarily limited to."

What is claimed is:

1. A computerized method for accelerating a handling of a media file being uploaded from a first computer system to a second computer system over a communication network, comprising:
   at a first computer system, electronically communicating with a second computer system over a communication network:
   receiving, during a continuous uploading event, an incoming stream of packets sent by said second computer system over said communication network, wherein the packets are generated from a media file comprising both at least one image and at least thumbnail image of said at least one image, wherein the at least one image is encoded according to a file format of the media file, and wherein packets generated from the at least one thumbnail image of the at one image and packets generated from the at least one image of the media file are transmitted to the first computer system;
   extracting the at least one thumbnail image of the at least one image of the media file, from one or more of the incoming packets, during the continuous uploading event of said at least one image of the media file and completing said extracting before all the packets of the incoming stream are received; and
   accelerating a displaying of a representative image of said at least one image, by displaying the at least one thumbnail image of the at least one image during the continuous uploading event of said at least one image of the media file, before all the packets of the incoming stream are received at the first computer system.

2. The method according to claim 1, wherein displaying the thumbnail image comprises displaying the thumbnail image within a web page provided by the first computer system to the second computer system.

3. The method according to claim 1, wherein said extracting is held before completing entirely the uploading of said at least one image by the first computer system.

4. The method according to claim 1, wherein said second computer system is at least one server.

5. The method according to claim 1, wherein the at one thumbnail image is stored in an intended field of said media file.

6. The method according to claim 1, wherein the intended field is in a header of said media file.

7. The method according to claim 1, wherein the extracting is performed in response to receiving a notification from the second computer system.

8. The method according to claim 1, wherein the extracting comprises determining that a number of bytes expected to include the thumbnail image.

9. The method according to claim 1, wherein the extracting comprises determining that the transmission was carried out over a period sufficient to include the entire thumbnail image.

10. The method according to claim 1, wherein the extracting is performed by the first computer system examining a content of the received packets.

11. The method of claim 1, further comprising searching for images similar to the at least one image, in an image database.

12. The method according to claim 11, wherein said images similar to the at least one image comprise a plurality of similar, but not identical, media files.

13. The method according to claim 1, further comprising stopping the transmission of the media file responsive to the completion of the extracting.

14. The method according to claim 1, wherein, wherein the transmitted at least one thumbnail image of the at least one image is further processed by said first computer system and appears as when processing of the media file in its entirety.

15. The method according to claim 1, wherein the receiving comprises receiving said thumbnail image within said media file without any separate indication to indicate said thumbnail image.

16. The method according to claim 1, wherein the receiving comprises receiving less than 10% of the media file.

17. The method according to claim 1, wherein the receiving comprises receiving packets including an entire thumbnail of said at least one thumbnail together with a portion of an actual image.

18. The method according to claim 1, wherein the receiving comprises receiving and reviewing said incoming stream of packets to identify whether a header of said media file includes said thumbnail image in an intended field.

19. A computer system, comprising:
a network interface adapted to receive during a continuous uploading event an incoming stream of packets sent by at least one server over a communication network, wherein the packets are generated from a media file comprising both at least one image and at least thumbnail image of said at least one image, wherein the at least one image is encoded according to a file format of the media file, and wherein packets generated from the at least one thumbnail image of the at one image and packets generated from the at least one image of the media file are transmitted to the computer device;
a processing unit adapted to extract the at least one thumbnail image of the at least one image of the media file, from one or more of the incoming packets, during the continuous uploading event of said at least one image of the media file and completing said extraction before all the packets of the incoming stream are received; and
a display adapted to accelerate a displaying of a representative image of said at least one image by displaying of the at least one thumbnail image of the least one image during the continuous uploading event of said at least one image the media file, before all the packets of the incoming stream are received.

20. A computerized method for accelerating a handling of a media file being uploaded from a first computer system to a second computer system over a communication network, comprising:
receiving, at a first computer, an incoming stream of packets sent by a second computer communicating with said first computer over a communication network, wherein the packets are generated from media file comprising at least one image and at least one thumbnail image of said at least one image, wherein the at least one image is encoded according to a file format of the media file, and wherein packets generated from the at least one thumbnail image of the at least one image and packets generated from the at least one image of the media file are transmitted to the first computer;
extracting, by the first computer, the at least one thumbnail image of the least one image of the media file, from one or more of the incoming packets, said extraction is conducted in parallel to the receiving of said at least one image; and is completed before all the packets are received and before completing entirely the reception of said at least one image; and
accelerating a transmission of a representative image of said at least one image, by transmitting, by the first computer and over said communication network, the at least one thumbnail image to a second or a third computer, said transmitting is conducted in parallel to the receiving of said at least one image and before all the packets of the incoming stream are received at the first computer, wherein the at least one thumbnail image is in a format usable for presenting by the second or the third computer.

* * * * *